US009052773B2

(12) United States Patent
Lin et al.

(10) Patent No.: US 9,052,773 B2
(45) Date of Patent: Jun. 9, 2015

(54) ELECTRONIC APPARATUS AND CONTROL METHOD USING THE SAME

(71) Applicant: Acer Incorporated, Hsichih, New Taipei (TW)

(72) Inventors: Shao-Chieh Lin, New Taipei (TW); Chih-Hsiang Lin, New Taipei (TW)

(73) Assignee: ACER INCORPORATED, Hsichih, New Taipei (TW)

( * ) Notice: Subject to any disclaimer, the term of this patent is extended or adjusted under 35 U.S.C. 154(b) by 11 days.

(21) Appl. No.: 13/845,939

(22) Filed: Mar. 18, 2013

(65) Prior Publication Data

US 2014/0062914 A1    Mar. 6, 2014

(30) Foreign Application Priority Data

Sep. 3, 2012    (TW) .............................. 101131973 A

(51) Int. Cl.
   *G06F 3/041*    (2006.01)
   *G06F 3/0485*    (2013.01)
   *G06F 3/0488*    (2013.01)
   *G06F 3/038*    (2013.01)

(52) U.S. Cl.
   CPC ............ *G06F 3/0416* (2013.01); *G06F 3/0485* (2013.01); *G06F 3/04883* (2013.01); *G06F 3/038* (2013.01); *G06F 2203/04806* (2013.01); *G06F 2203/04808* (2013.01)

(58) Field of Classification Search
   CPC .................. G06F 3/041–3/047; G06F 3/0412; G06F 3/0484; G06F 3/0485; G06F 3/0486; G06F 3/0488; G06F 3/03547; G06F 3/038; G06F 3/0416; G06F 3/04883; G06F 2203/04806; G06F 2203/04808

USPC .......................................................... 345/173
See application file for complete search history.

(56) References Cited

U.S. PATENT DOCUMENTS

| 8,593,416 | B2* | 11/2013 | Hsieh et al. .................... 345/173 |
| 8,717,304 | B2* | 5/2014 | Cho et al. ....................... 345/173 |
| 2008/0087477 | A1* | 4/2008 | Cho et al. ..................... 178/18.01 |
| 2008/0165141 | A1* | 7/2008 | Christie ......................... 345/173 |
| 2009/0284495 | A1* | 11/2009 | Geaghan et al. ............... 345/174 |
| 2009/0322699 | A1* | 12/2009 | Hansson ........................ 345/174 |
| 2010/0039405 | A1* | 2/2010 | Chen et al. .................... 345/174 |
| 2010/0079392 | A1* | 4/2010 | Chiang et al. ................. 345/173 |
| 2010/0090971 | A1* | 4/2010 | Choi et al. ..................... 345/173 |

(Continued)

FOREIGN PATENT DOCUMENTS

TW          201120731 A      6/2011

OTHER PUBLICATIONS

TW Office Action dated Jun. 16, 2014.

(Continued)

*Primary Examiner* — Tom Sheng
(74) *Attorney, Agent, or Firm* — McClure, Qualey & Rodack, LLP

(57) ABSTRACT

Control methods of an electronic apparatus having a touch pad are provided. Touch event with the touch pad is first detected. It is then determined whether the touch event is a single-touch event or a multi-touch event. In response to the touch event being the multi-touch event, the touch event is simulated to a first event initialized by a touch panel by a simulation device to generate a multi-touch signal to an operation system such that the operation system performs a corresponding touch simulation.

7 Claims, 7 Drawing Sheets

(56) References Cited

U.S. PATENT DOCUMENTS

| | | | |
|---|---|---|---|
| 2010/0259493 A1* | 10/2010 | Chang et al. | 345/173 |
| 2011/0018806 A1* | 1/2011 | Yano | 345/163 |
| 2011/0081889 A1* | 4/2011 | Gao et al. | 455/411 |
| 2011/0084937 A1* | 4/2011 | Chang et al. | 345/174 |
| 2011/0157053 A1 | 6/2011 | Webb et al. | |
| 2011/0254803 A1* | 10/2011 | Chae et al. | 345/174 |
| 2012/0016628 A1* | 1/2012 | Chang et al. | 702/150 |
| 2012/0096393 A1* | 4/2012 | Shim et al. | 715/784 |
| 2012/0120004 A1* | 5/2012 | Chang et al. | 345/173 |
| 2012/0162112 A1* | 6/2012 | Cho | 345/173 |
| 2012/0218203 A1* | 8/2012 | Kanki | 345/173 |
| 2012/0236037 A1* | 9/2012 | Lessing et al. | 345/661 |
| 2012/0256880 A1* | 10/2012 | Han et al. | 345/175 |
| 2013/0002586 A1* | 1/2013 | Kung | 345/173 |
| 2013/0019193 A1 | 1/2013 | Rhee et al. | |
| 2013/0038541 A1* | 2/2013 | Bakker | 345/173 |
| 2013/0100067 A1* | 4/2013 | Dews | 345/174 |
| 2013/0176298 A1* | 7/2013 | Lee et al. | 345/419 |
| 2013/0194226 A1* | 8/2013 | Benhamouda | 345/174 |
| 2013/0222275 A1* | 8/2013 | Byrd et al. | 345/173 |
| 2013/0328793 A1* | 12/2013 | Chowdhury | 345/173 |

OTHER PUBLICATIONS

English Abstract translation of TW201120731 (Published Jun. 16, 2011).

* cited by examiner

ELECTRONIC APPARATUS AND CONTROL METHOD USING THE SAME

CROSS REFERENCE TO RELATED APPLICATIONS

This application claims priority of Taiwan Application No. 101131973, filed on Sep. 3, 2012, and the entirety of which is incorporated by reference herein.

BACKGROUND OF THE INVENTION

1. Field of the Invention

The disclosure relates generally to electronic apparatuses and control methods thereof, and more particularly, to electronic apparatuses having a touch pad and control methods thereof.

2. Description of the Related Art

Driven by user requirements, more and more electronic apparatuses, especially handheld or portable electronic apparatuses such as smart phones, personal digital assistants (PDAs), tablet PCs or Ultra Mobile PCs (UMPCs), and each of these comprises a touch screen or a touch panel. The touch screen or the touch panel can be directly touched by users and used as one of the main input devices. Electronic apparatuses with the touch panel allow users to touch the screen to generate a touch event by using their fingers or styluses to input a selection or move a cursor on the screen. The touch panels can then identify the touch event and the touch position on the display screen of the touch panel on which the touch event occurs and perform responsive operations based on the touch event.

Some electronic apparatuses such as laptops, however, usually only provided with a touch pad, so that cursor can be controlled to select and perform task through finger actions, to provide functions like mouse. Current touch pad mostly be utilized to simulate mouse behaviors, such as mouse wheel actions and left and right arrow keys to trigger. However, as applications of touch interface with touch operation, such as operation systems (OS) providing multi-touch applications, are getting more and more, optimal user experience could not be provided with such simulation applied to touch interface applications. For example, when users want to scroll browser pages, the mouse wheel operation can only provide scrolling with hierarchical variations (similar to keyboard Ctrl+"+" or Ctrl+"−") and it can not provide linear variations as the smooth sliding of the touch panel.

BRIEF SUMMARY OF THE INVENTION

Electronic apparatuses having a touch pad and control methods using the same are provided to provide further control of the electronic apparatus for users.

In an embodiment of a control method of an electronic apparatus having a touch pad, a touch event with the touch pad is first detected. It is then determined whether the touch event is a single-touch event or a multi-touch event. In response to the touch event being the multi-touch event, a simulation device is utilized to simulate the touch event to a first event initialized by a touch panel to generate a multi-touch signal to an operation system such that the operation system performs a responsive touch simulation operation corresponding to the multi-touch signal.

An embodiment of an electronic apparatus comprises a touch pad, a processor and a simulation device. The processor which includes an operation system is coupled to the touch pad for performing a mouse simulation operation or a touch simulation operation through the operation system. The simulation device which is coupled to the touch pad and the processor is arranged for determining whether a touch event is a single-touch event or a multi-touch event when detecting the touch event with the touch pad and in response to the touch event being the multi-touch event, simulating the touch event to a first event initialized by a touch panel to generate a multi-touch signal to the operation system, such that the operation system performs a responsive touch simulation operation corresponding to the multi-touch signal.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention provide an electronic apparatus with a composite touch pad and related control method thereof, wherein the control method can distinguish whether touch of the composite touch pad is generated by a single-touch event (i.e. single-point touch event) or a multi-touch event (i.e. multiple-points touch event) and can generate responsive mouse signal or touch signal to simulate the mouse or touch input accordingly for providing more intuitive touch operation of the electronic apparatus for users.

Figure 1:
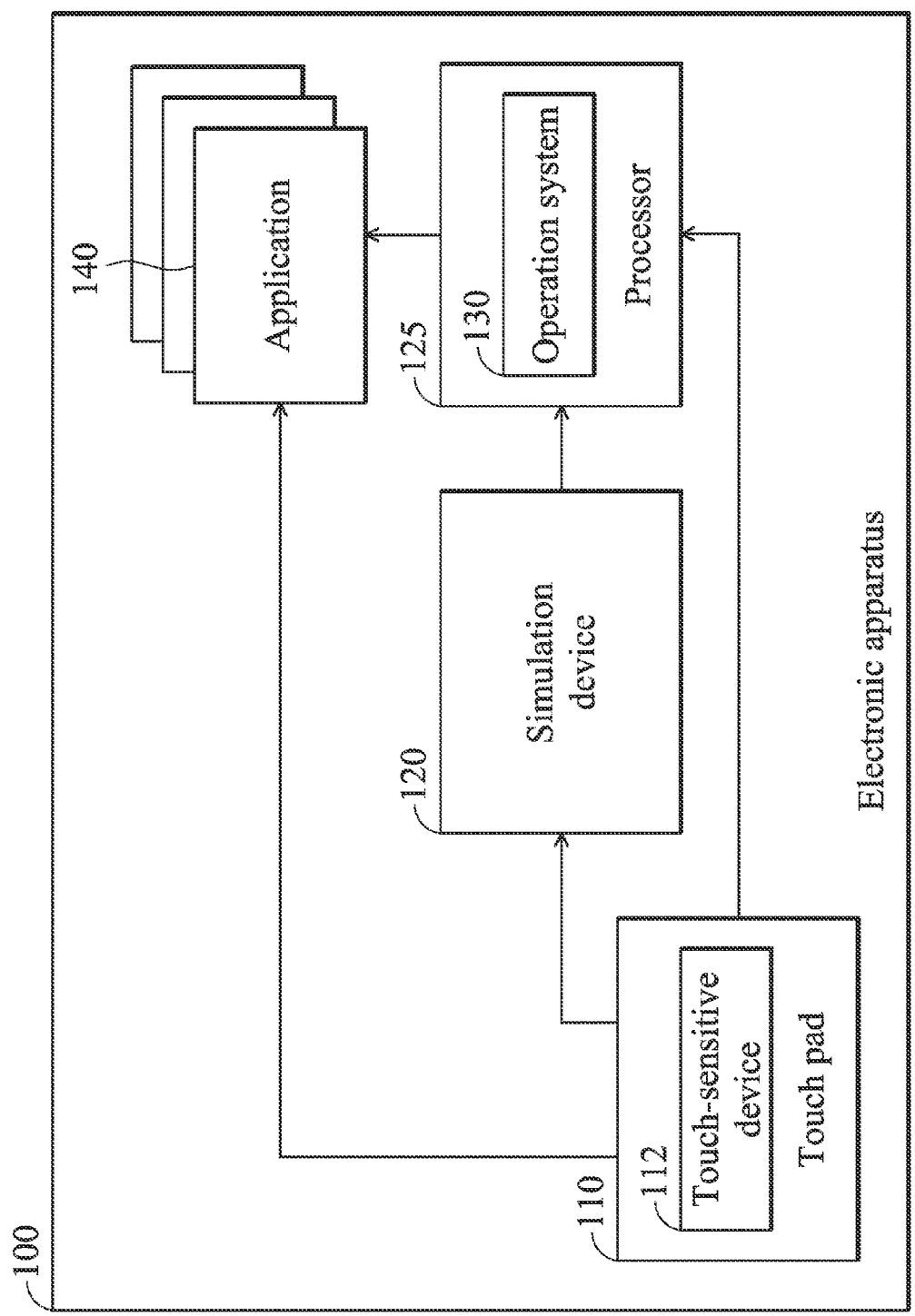
FIG. 1 is a schematic diagram illustrating an embodiment of an electronic apparatus of the invention.

FIG. 1 is a schematic diagram illustrating an embodiment of an electronic apparatus of the invention. The electronic apparatus 100 may be a personal computer and a portable device, such as a Mobile Internet Device (MID), a laptop computer, a Netbook or any other type of handheld device. However, it is to be understood that the invention is not limited thereto. The electronic apparatus 100, which may be a handheld device, may at least comprise a touch pad 110, a simulation device 120, and a processor 125 comprising at least one application 140. The touch pad 110 may receive inputs by users. The users may input data by operations performed on the touch pad 110. It is understood that, in this embodiment, the touch pad 110 may be integrated with a touch-sensitive device 112. The touch-sensitive device 112 has a touch-sensitive surface comprising sensors in at least one dimension to detect touch and movement of at least one object (input tool), such as a pen/stylus or finger near or on the touch-sensitive surface, so as to allow the users to perform a single-point touch input (also referred to as a single-touch input) or a multi-point touch input (also referred to as a multi-touch input) via the input tool (e.g. a pen/stylus or finger). The processor 125 further includes an operation system (OS) 130. The simulation device 120 is a virtual device generated simultaneously as the touch pad 110 activated, which is mainly arranged for the touch pad 110 to transmit touch information to the OS 130 under specific use mode, such that the touch pad 110 can simulate touch behaviors. The processor 125 is coupled to the touch pad 110 and the simulation device 120 and is arranged for performing simulation of a mouse input through the OS 130 based on mouse signals from the touch pad 110, or performing simulation of a touch input through the OS 130 based on touch signals generated by the simulation device 120. For example, when the OS 130 performs the mouse input simulation, the OS 130 treats the input from the touch pad 110 as a mouse input. When the OS 130 performs a touch input simulation, the OS 130 treats the input from the touch pad 110 as a touch input of a touch pad. The OS 130 can be Windows OS supporting a multi-touch operation, such as a Microsoft™ Window 7, Window 8 OS and so on. The application 140 may receive the touch signal or the mouse input signal from the Windows OS 130 and perform subsequent operations based on information received. In some embodiments, the application 140 can be stored in a storage unit (not shown) such as a hard disk, and can be loaded and executed by the processor 125 to receive signals from the Windows OS 130 only when it is to be executed. The electronic apparatus 100 can perform the control method of the present invention, which will be discussed further in the following paragraphs.

Figure 2:
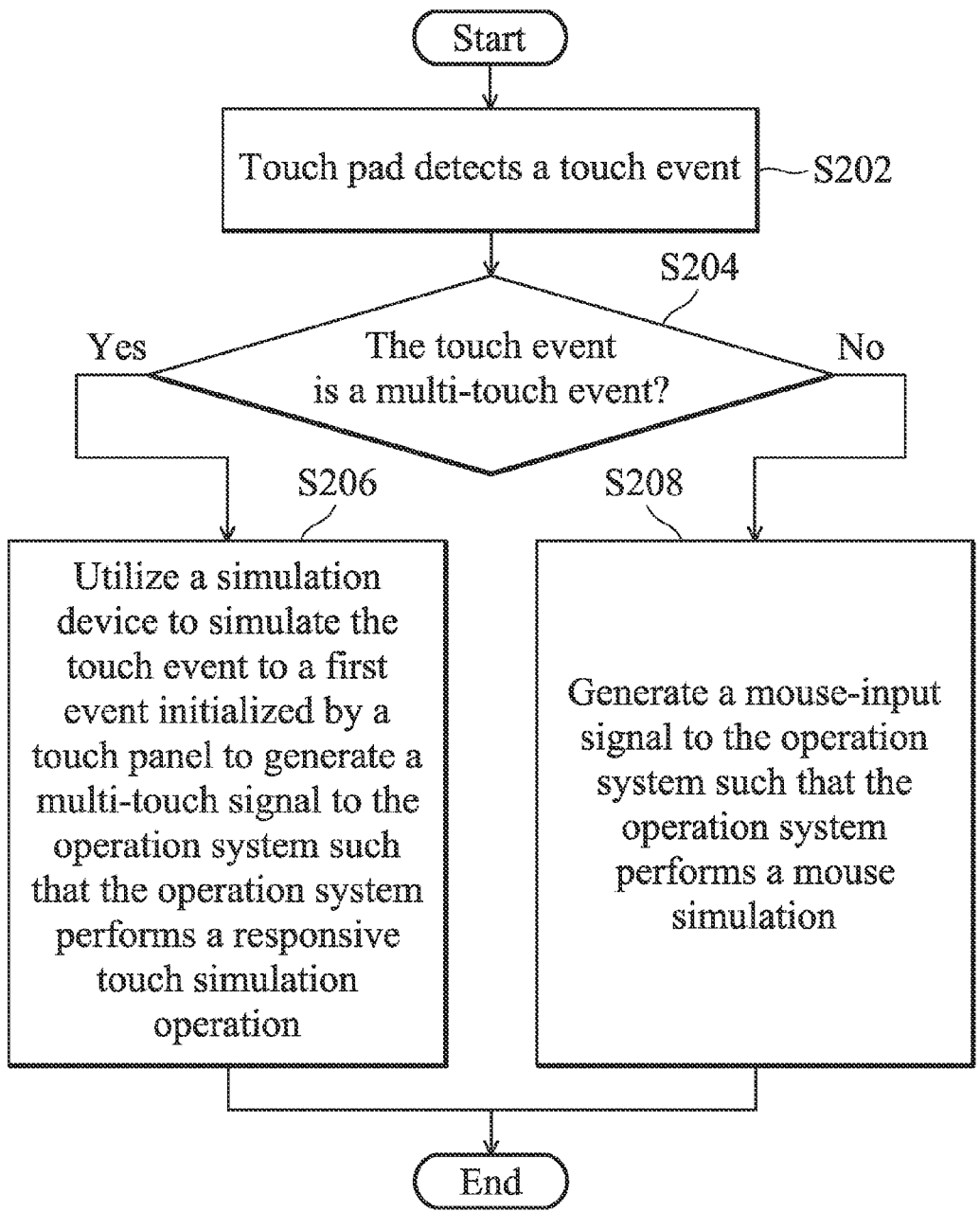
FIG. 2 is a flowchart of an embodiment of a control method of an electronic apparatus of the invention.

FIG. 2 is a flowchart of an embodiment of a control method of an electronic apparatus of the invention. Please refer to FIGS. 1 and 2. The control method can be applied to the electronic apparatus 100 for determining whether a detected touch event is a mouse input or a touch input.

First, in step S202, the touch pad 110 detects a touch event. Then, in step S204, the touch pad 110 determines whether the touch event is a multi-touch event. To be more specific, the touch-sensitive device 112 of the touch pad 110 can determine whether the touch event is a single-touch event generated by single finger or a multi-touch event generated by two or more fingers by detecting the number of touch points corresponding to the touch event. When the touch event is detected relative to two or more touch points, then it is determined as a multi-touch event. On the contrary, when the touch event is detected relative to a single touch point, then it is determined as a single-touch event.

Thereafter, in response to the touch event being determined as the single-touch event (No in step S204), which means that users wish to perform a mouse simulation, in step S208, the touch pad 110 generates a mouse input signal to the OS 130 such that the OS 130 performs the mouse simulation. In this case, the OS 130 will treat the touch event as a normal mouse input.

Contrarily, in response to the touch event being determined as the multi-touch event (Yes in step S204), which means that users wish to perform a touch simulation, in step S206, the touch pad 110 utilizes the simulation device 120 to simulate the touch event to a first event initialized by a touch panel to generate a multi-touch signal to the OS 130 such that the OS 130 performs a responsive touch simulation operation corresponding to the multi-touch signal. In this case, the OS 130 will treat the touch event as a touch input from a typical touch panel. Thus, the touch pad 110 can provide functionalities of both the mouse input and the touch input from the touch panel.

In this embodiment, when detecting that the multi-touch event corresponds to two touch points, the touch-sensitive device 112 of the touch pad 110 can further determine various touch operations of touch panel simulated and accurately distinguish such touch operations. For example, the touch operations simulated by the multi-touch event may at least include one of a tap operation, a pan operation, a zoom operation, and a rotate operation and so on, but the invention is not limited thereto.

Figure 3:
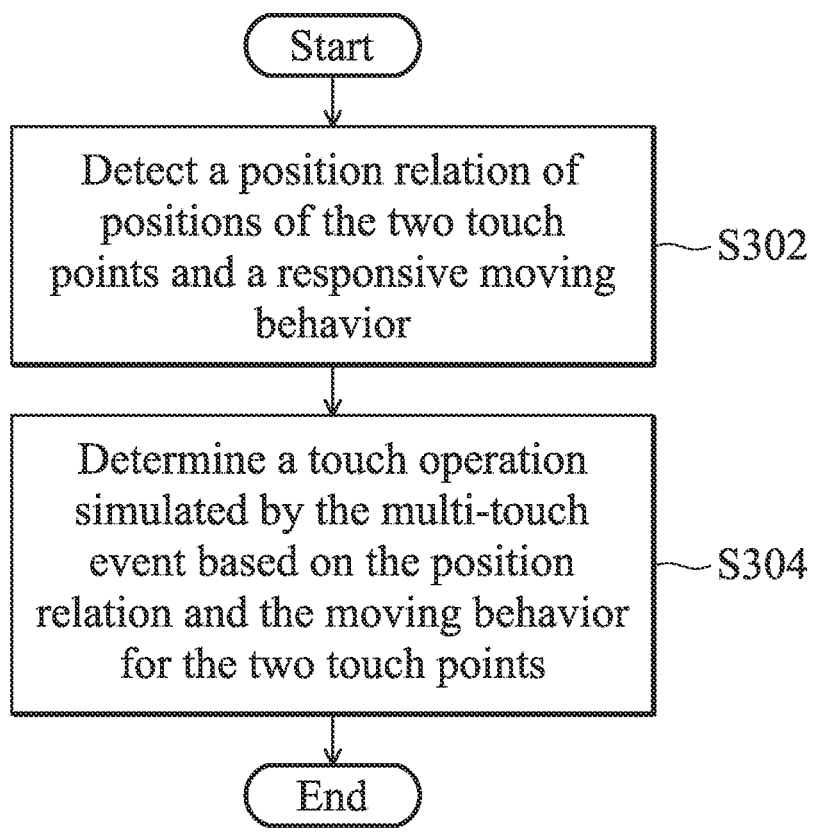
FIG. 3 is a flowchart of another embodiment of a control method of an electronic apparatus of the invention.

FIG. 3 is a flowchart of another embodiment of a control method of an electronic apparatus of the invention. Please refer to FIGS. 1 and 3. The control method can be applied to the electronic apparatus 100 for determining the type of the touch operation simulated by the multi-touch event when detecting a two-point touch input.

First, when the touch pad 110 detects a two-point touch event, i.e. the multi-touch event corresponding to two touch points, the touch pad 110 detects a position relation of positions of the two touch points and a moving behavior corresponding to the two touch points (step S302). Note that the touch-sensitive device 112 of the touch pad 110 may continuously detect/measure various parameters of the two touch points, such as their positions, moving distance, moving angle and so on, to determine the position relation and the moving behavior for the two touch points. Thereafter, the touch pad 110 may determine which touch operation is simulated by the multi-touch event based on the measured/determined position relation and moving behavior for the two touch points (step S304). For example, the touch operations simulated by the multi-touch event may at least include one of a tap operation, a pan operation, a zoom operation, and a rotate operation, but the invention is not limited thereto.

For example, in one embodiment, the touch operations can be determined using the method as below. Assume that two contact-points input have been detected, the touch pad may collect a variation amount of information on the touch pad 110, wherein the variation amount combinations can be totals of relative closing distance, relative leaving distance, moving distance, movement angle or the like of two touch points, and each combination element can have different weight. For example, the variation amount Var can be defined by following formula (1):

$$Var=(D1*wD1)+(D2*wD2)+(M*wM)+(A*wA) \qquad (1),$$

where, D1 represents relative closing distance of the two touch points, wD1 represents relative weight of D1; D2 represents relative leaving distance of two touch points, wD2 represents relative weight of D2; M represents relative moving distance of two touch points, wM represents relative weight of M; and A represents relative moving angle of two touch points, wA represents relative weight of A.

After that, which touch operation that the touch operation simulated by the multi-touch event pertains to can be determined based on the variation amount Var. When the variation amount Var is greater than a certain extent for a specific touch behavior, then the specific touch behavior can be determined.

Figure 5A:
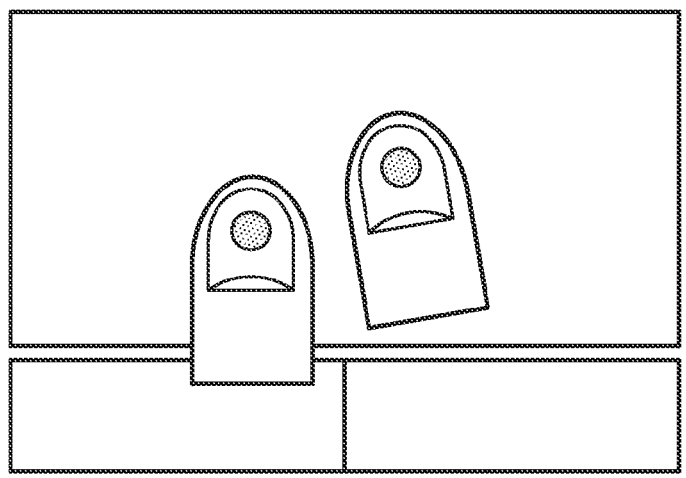
FIGS. 5A to 5F are schematic diagrams illustrating embodiments of operations of various touch events of the invention.

When the touch behavior is determined as two touch points dropped and without large movement or rotation, i.e. the positions of the two touch points keep unchanged and no moving behavior occurs, the touch operation simulated by the multi-touch event is determined as a tap operation, as shown in FIG. 5A. Thus, the touch pad 110 may request the simulation device 120 to send a touch input signal indicating the tap operation to the OS 130 based on present cursor position.

Figure 5B:
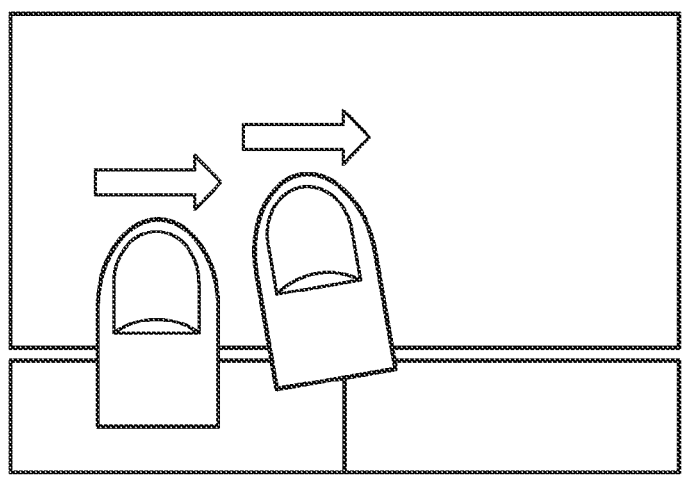

When the touch behavior is determined as two touch points dropped and moving along a same direction (with the moving direction not limited), i.e. the positions of the two touch point vary along the same direction and the distance between the positions remains substantially unchanged, the touch operation simulated by the multi-touch event is determined as a pan operation, as shown in FIG. 5B. Thus, the touch pad 110 may convert the moving distance of the two touch points to the moving distance triggered by the touch pan operation and then request the simulation device 120 to send a touch input signal indicating the pan operation to the OS 130 based on the converted moving distance.

Figure 5C:
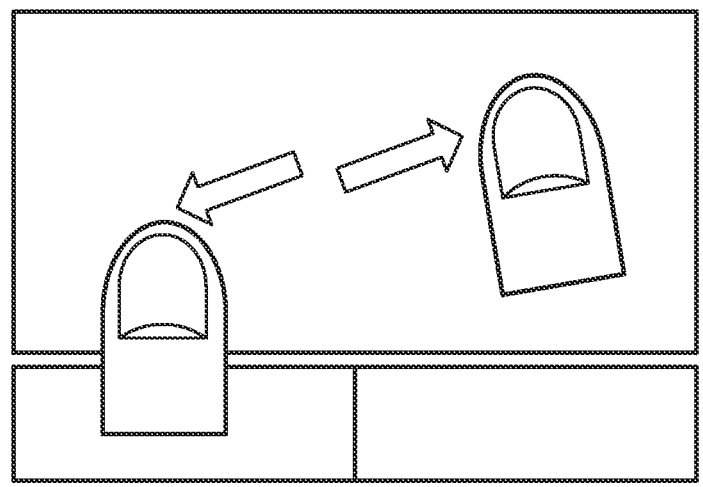

When the touch behavior is determined as two touch points dropped and moving along opposite directions, i.e. the positions of the two touch point vary along opposite directions and the distance between the positions be changed to longer or shorter, the touch operation simulated by the multi-touch event is determined as a zoom operation, as shown in FIG. 5C. Thus, the touch pad 110 may convert the moving distance of the two touch points to the relative zoom ratio corresponding to the touch zoom operation and then request the simulation device 120 to send a touch input signal indicating the zoom operation to the OS 130 based on the converted zoom ratio.

Figure 5D:
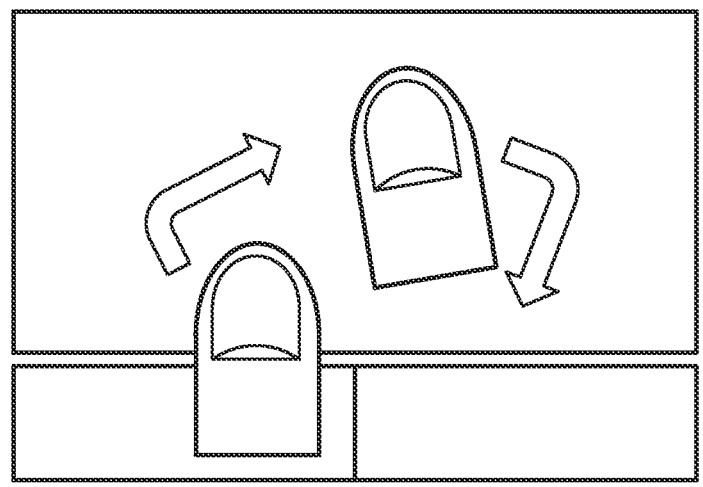

When the touch behavior is determined as two touch points dropped and form an annular gesture, i.e. the positions of the two touch point vary along a clockwise or a counter-clockwise direction and the distance between the touch points can be either shorter, longer or unchanged, the touch operation simulated by the multi-touch event is determined as a rotating operation, as shown in FIG. 5D. Thus, the touch pad 110 may request the simulation device 120 to send a touch input signal indicating the rotate operation to the OS 130. Thus, users only need to perform operation on the touch pad 110 based on input method on their touch panel, making convenience in use.

Figure 5E:
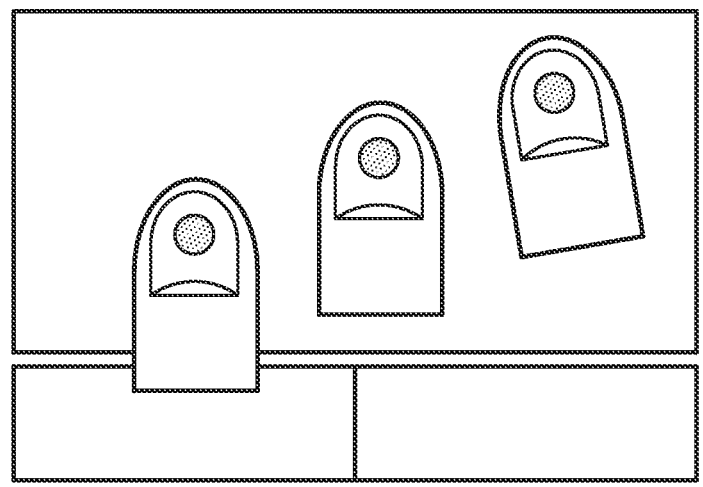

In some embodiments, the electronic apparatus 100 of the present invention may further provide a predetermined application and users may directly activate the predetermined application via specific gestures on the touch pad 110. The touch pad may further determine the number of the touch points corresponding to the multi-touch event and in response to detecting that the multi-touch event corresponds to three touch points (for example the multi-touch event is generated by three fingers) or the multi-touch event is generated by a specific gesture, the touch pad 110 directly activates the predetermined application without a need of the OS 130. For example, when the touch pad 110 receives a number of specific inputs, such as a three-fingers touch (as shown in FIG. 5E) to directly activate a specific upper-layer application.

In some embodiments, the electronic apparatus 100 of the present invention may further provide a user interface for selecting/configuring an operation mode of the touch pad 110 such that upon receiving input of the single-touch event which is generated by single touch point, the touch pad 110 may further determine whether to send a mouse input signal to the OS 130 directly or to convert the input to a multi-touch signal first via the simulation device 120 first and then send the converted multi-touch signal to the OS 130.

Figure 4:
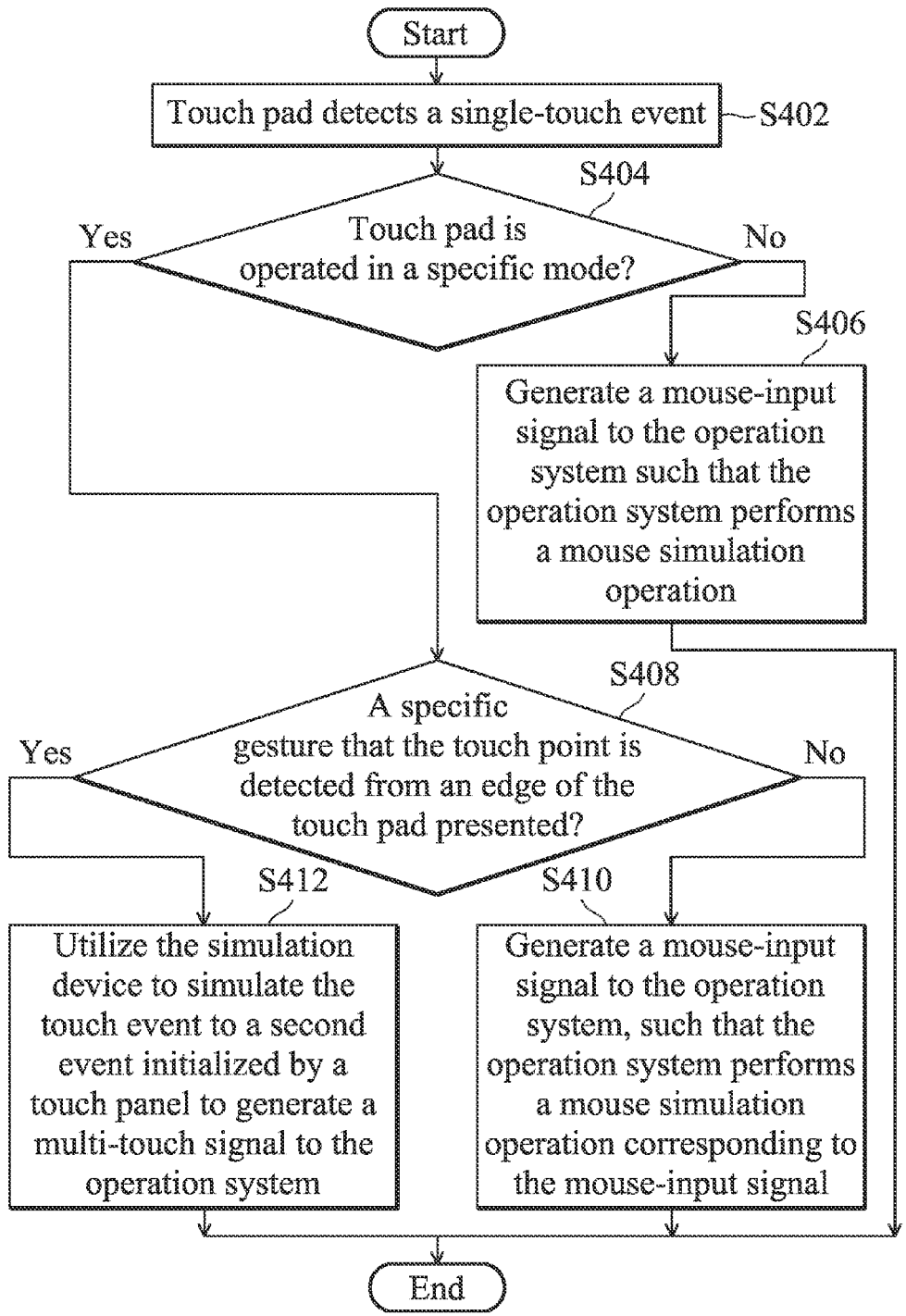
FIG. 4 is a flowchart of yet another embodiment of a control method of an electronic apparatus of the invention.

FIG. 4 is a flowchart of yet another embodiment of a control method of an electronic apparatus of the invention. Please refer to FIGS. 1 and 4. The control method can be applied to the electronic apparatus 100 for determining the touch operation that is simulated by the touch event based on the operation mode of the touch pad when detecting the single-touch input. In this embodiment, assume that the touch pad 110 can be selected/configured to be operated in a first mode and a second mode via a user interface, wherein the touch pad 110 can indicate a touch input or a mouse input when it is operated in the second mode.

In response to the touch event being a single-touch event (step S402), the touch pad 110 determines whether the touch pad 110 is operated in a specific mode (the second mode) (step S404). When the touch pad 110 is not operated in the specific mode (i.e. it is operated in the first mode) (No in step S404), the touch pad 110 generates a mouse input signal to the OS 130 such that the OS 130 performs the mouse simulation operation (step S406). In this case, the OS 130 will treat the touch event as a general mouse input.

Figure 5F:
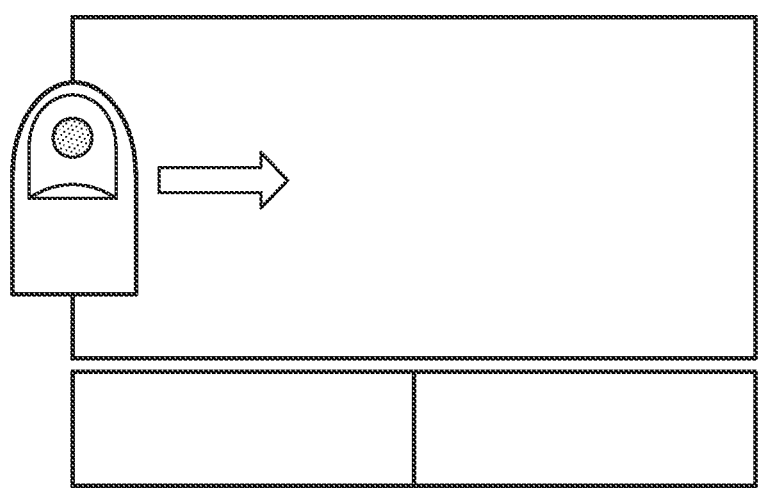

When the touch pad 110 is operated in the specific mode (i.e. it is operated in the second mode) (Yes in step S404), the touch pad 110 further determines whether a touch point corresponding to the single-touch event is detected from any edge of the touch pad 110 (step S408). In other words, the touch pad 110 may determine whether the single-touch event is generated by a specific gesture starting from one of its edges (also referred as the from edge gesture) as shown in FIG. 5F. When determining that the touch point of the touch pad 110 corresponding to the single-touch event is not detected from any edge of the touch pad 110 (No in step S408), the touch pad 110 generates a mouse-input signal to the OS 130, such that the OS 130 performs a mouse simulation operation corresponding to the mouse-input signal (step S410). In this case, the OS 130 will treat the touch event as a general mouse input.

Contrarily, when determining that the touch point of the touch pad 110 corresponding to the single-touch event is detected from an edge of the touch pad 110 (Yes in step S408), the touch pad 110 utilizes the simulation device 120 to simulate the single-touch event to a second event initialized by the touch panel to generate the multi-touch signal to the OS (step S412). In this case, the OS 130 will treat the touch event as a touch input of general touch pad.

Moreover, generally speaking, when users operate the touch pad 110 with two fingers, the touch pad 110 may request the simulation device 120 to input touch information to the OS 130 based on cursor positions. In some embodiments, for accurately simulating various touch operation behaviors of the touch panel, cursor position needed to be referenced to modify/adjust input touch positions, so as to cope with different situations.

In one embodiment, assume that the user uses two fingers to operate a zoom-in or zoom-out gesture. When the user uses two fingers to operate a zoom-in or a zoom-out gesture, if the cursor positions are close to screen edge range, the positions of the two touch points must be fallen into the screen range.

For example, when the cursor positions are not close to the screen edge range, a fixed distance between the two touch points may be used as input, and when the cursor positions are close to the screen edge range, a fixed distance between two touch points may be used as input and ensuring inputted positions of the touch points must be fallen into the screen range.

In another embodiment, assume that the user uses two fingers with parallel moving to operate a scroll gesture. In this embodiment, the scroll effect can be reached through two approaches, that is, continue inputting of the positions of the two touch points and inputting the positions of the two touch points at once, respectively.

For example, when the user uses two fingers moving in parallel toward left, the input touch points will be based on cursor positions of the relative touch points, but if the touch point position are about to or already moved to outside of the screen, the scroll operation will be stopped. Meanwhile, continuous scrolling effect can be reached through the approach of duplicate inputting of the positions of the two touch points, to return the touch points to their initial points to restart continued input. If the cursor positions are too close to edge, the initial touch positions can be moved a proper distance toward the screen center, to achieve continued scrolling.

In some embodiments, some applications can allow scrolling UI components by multi-touch parallel moving behavior, even when a touch point has been already fallen into outside of screen range or already triggered touch up behavior. Therefore, when the cursor positions are closing to edge, then multiple touch points can be input at one time and let only one of those touch point positions remains on cursor position, and others fall on far side, so that scrolling operation is continuous.

Therefore, the electronic apparatus having a touch pad and related control method of the invention can provide a touch input simulation for simulating input by a touch panel and mouse input simulation for simulating input by a mouse respectively based on the touch event detected by the touch pad for providing a more diverse and intuitive control method for users, thus, providing users with preferred touch using experience.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. An electronic apparatus, comprising:
    a touch pad;
    a processor including an operation system, the processor being coupled to the touch pad for performing a mouse simulation operation or a touch simulation operation through the operation system; and
    a simulation device coupled to the touch pad and the processor, determining whether a touch event is a single-touch event or a multi-touch event when detecting the touch event with the touch pad, and in response to the touch event being the single-touch event, the touch pad generates a mouse-input signal to the operation system such that the operation system performs a mouse simulation operation corresponding to the mouse-input signal and in response to the touch event being the multi-touch event, simulating the touch event to a first event initialized by a touch panel to generate a multi-touch signal to the operation system,
    such that the operation system performs a responsive touch simulation operation corresponding to the multi-touch signal,
    wherein when the multi-touch event corresponds to two touch points, the touch pad further detects a relation of positions of the two touch points and a distance between the touch points, and determines a touch operation that is simulated by the multi-touch event according to the relation of the positions of the two touch points and the distance between the touch points.

2. The electronic apparatus of claim 1, wherein the touch operation simulated by the multi-touch event comprises at least one of a tap operation, a pan operation, a zoom operation and a rotate operation.

3. The electronic apparatus of claim 2, wherein the touch pad determines the touch operation simulated by the multi-touch event to be the tap operation when the positions of the two touch points and the distance between the touch points keep unchanged.

4. The electronic apparatus of claim 2, wherein the touch pad determines the touch operation simulated by the multi-touch event to be the pan operation when the positions of the two touch points vary along a same direction and the distance between the touch points remains unchanged.

5. The electronic apparatus of claim 2, wherein the touch pad determines the touch operation simulated by the multi-touch event to be the zoom operation when the positions of the two touch points vary along opposite directions and the distance between the touch points varies to be shorter or longer.

6. The electronic apparatus of claim 2, wherein the touch pad determines the touch operation simulated by the multi-touch event to be a rotating operation when the positions of the two touch points vary along a clockwise direction or a counterclockwise direction and the distance between the touch points is shorter, longer or unchanged.

7. The electronic apparatus of claim 2, wherein the touch pad further determines whether a touch point of the touch pad corresponding to the single-touch event is detected from any edge of the touch pad in response to the touch event being the single-touch event, and wherein when determining that the touch point of the touch pad corresponding to the single-touch event is detected from an edge of the touch pad, the touch pad utilizes the simulation device to simulate the single-touch event to a second event initialized by the touch panel to generate the multi-touch signal to the operation system, and when determining that the touch point of the touch pad corresponding to the single-touch event is not detected from the edge of the touch pad, the touch pad generates the mouse-input signal to the operation system such that the operation system performs the mouse simulation operation corresponding to the mouse-input signal.

* * * * *